United States Patent [19]

Tichy et al.

[11] 4,363,266
[45] Dec. 14, 1982

[54] MACHINE FOR SLICING UNPEELED APPLES INTO RINGS

[75] Inventors: Oldrich J. Tichy, Concord; Iraj Teranchi, Glen Ellen, both of Calif.

[73] Assignee: Atlas Pacific Engineering Company, Emeryville, Calif.

[21] Appl. No.: 194,777

[22] Filed: Oct. 7, 1980

[51] Int. Cl.$^3$ .......................... A23N 3/00; A23N 4/14
[52] U.S. Cl. ....................................... 99/545; 99/546; 99/549; 99/552
[58] Field of Search ........................ 99/537, 542–546, 99/547, 557, 558, 559, 538–539, 549, 550, 552–556, 564, 636; 83/858

[56] References Cited

U.S. PATENT DOCUMENTS

| 925,150 | 6/1909 | Zastrow | 99/545 |
| 1,142,216 | 6/1915 | Wolf | 99/545 |
| 3,586,081 | 6/1971 | Loveland et al. | 99/542 |
| 3,586,151 | 6/1971 | Loveland et al. | |
| 3,734,002 | 5/1973 | Loveland | 99/543 |
| 3,869,974 | 3/1975 | Ellis | 99/547 |
| 3,948,132 | 4/1976 | Camp | 83/858 |

Primary Examiner—Philip R. Coe
Assistant Examiner—Timothy F. Simone

[57] ABSTRACT

In prior U.S. Pat. Nos. 3,586,081, 3,586,151 and 3,869,974, machines are disclosed for orienting an apple along the axis of its central core. The oriented apple was impaled on a fork and rotated while being processed. The machine herein disclosed cuts the apple into a plurality of rings and thereafter removes the core so that when the apple is released, one has a plurality of annular apple segments which are useful in decorating salads and the like.

6 Claims, 8 Drawing Figures

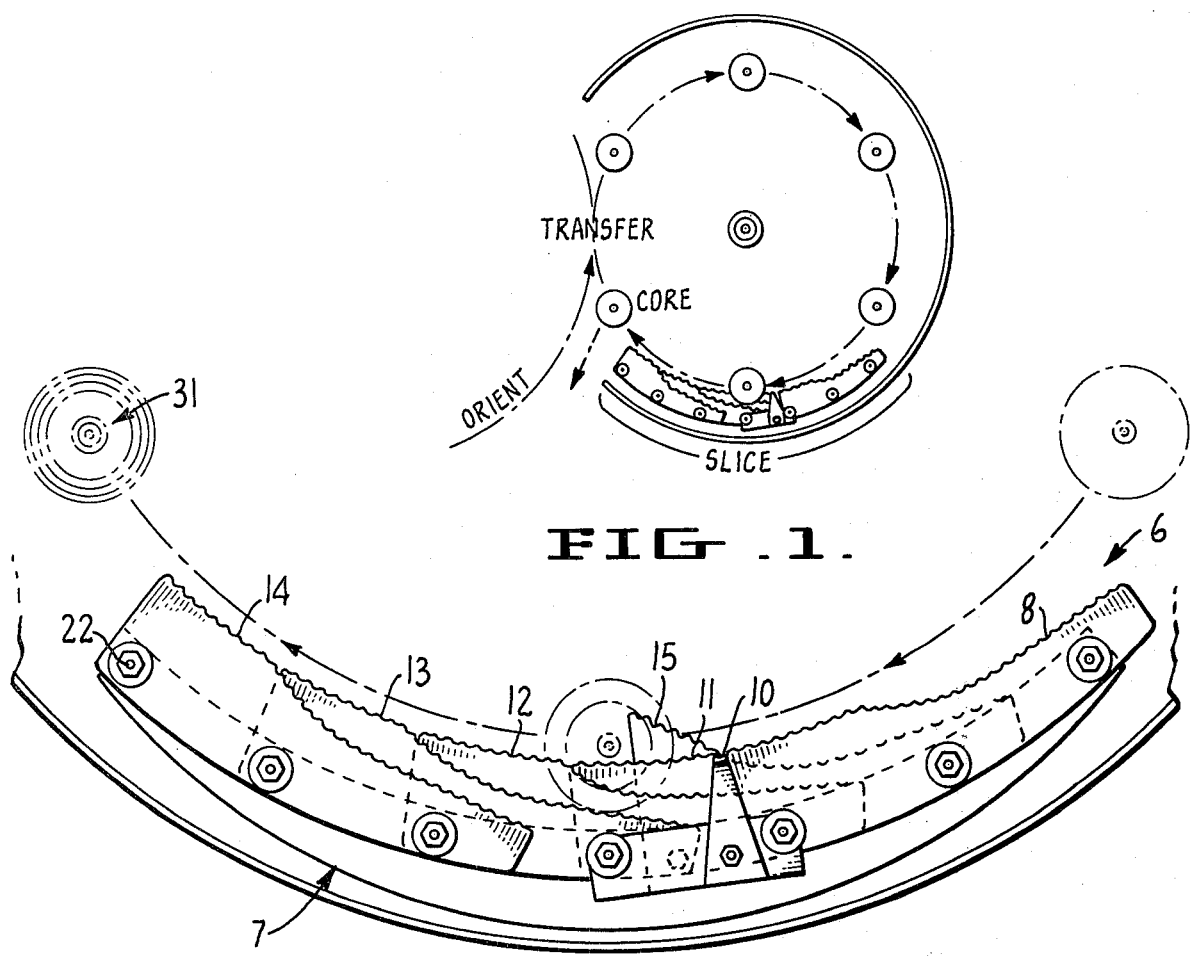
FIG. 1.
FIG. 2.
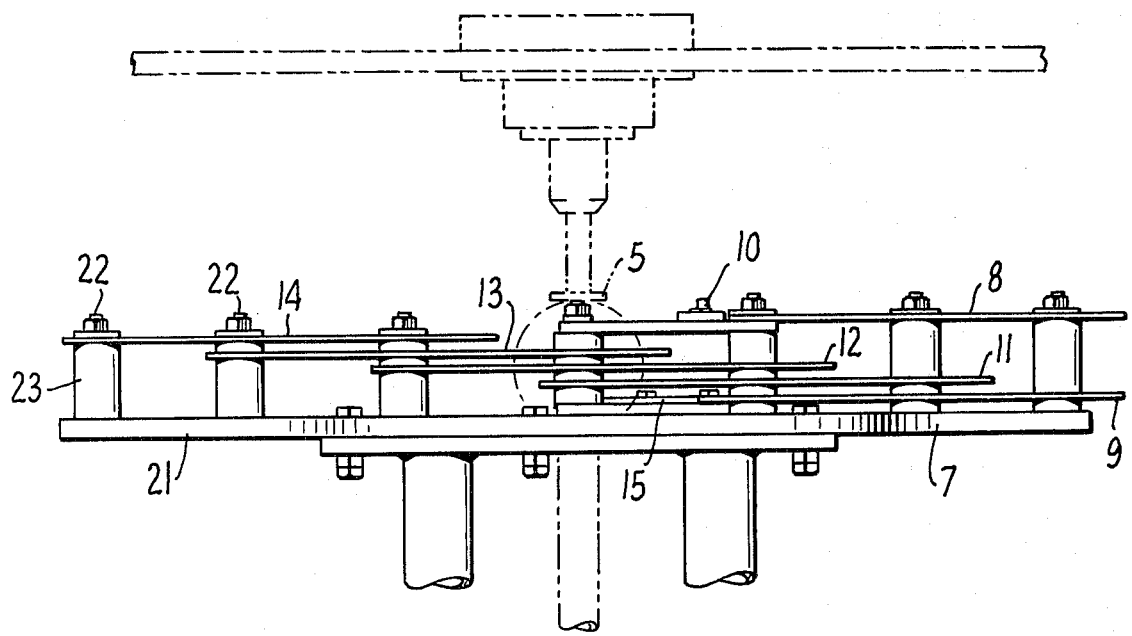
FIG. 3.

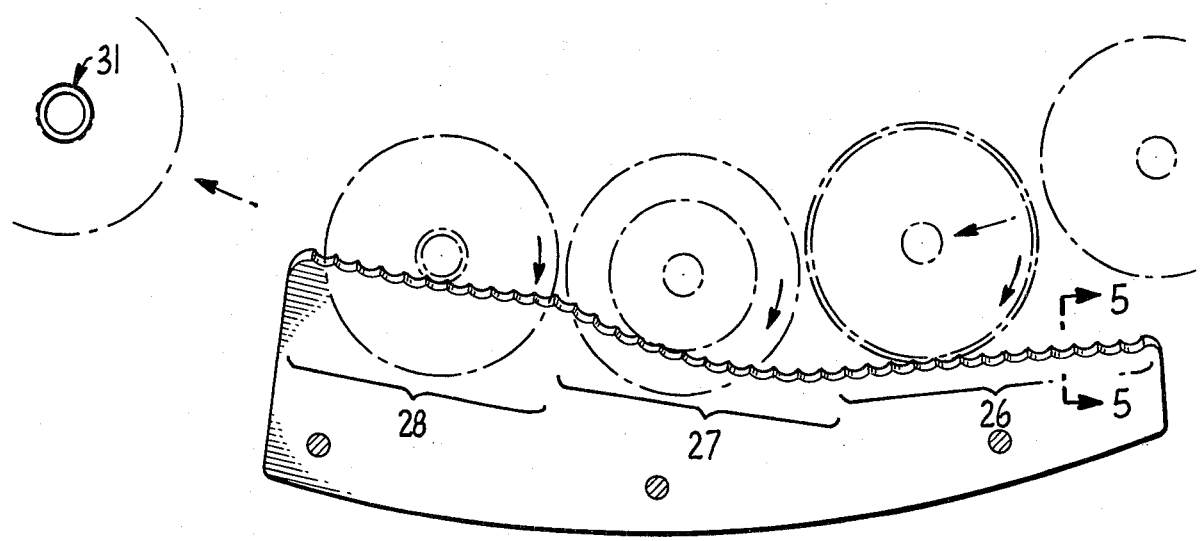
FIG. 4.
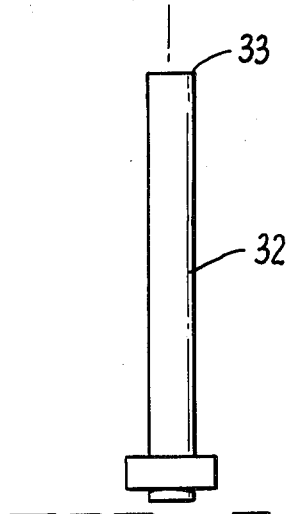
FIG. 5.
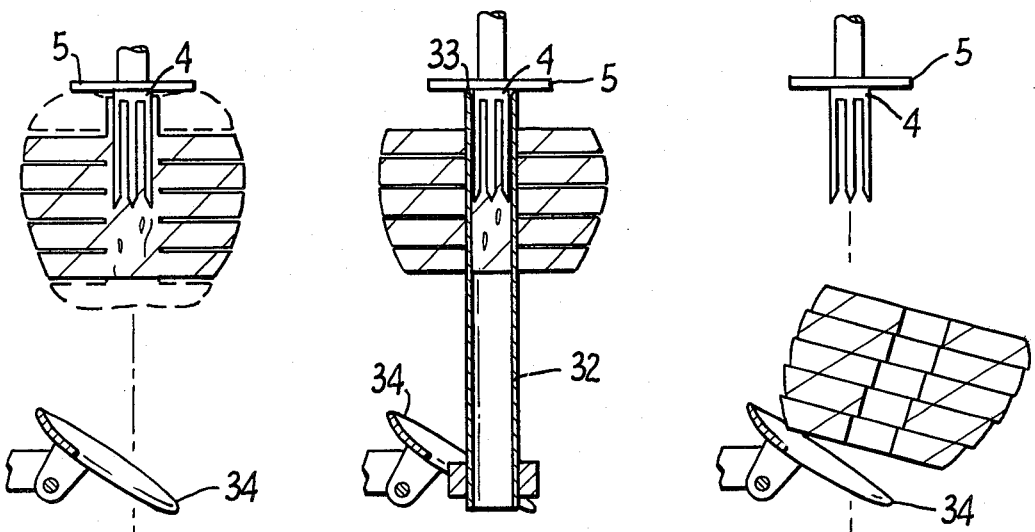
FIG. 7.
FIG. 6.
FIG. 8.

MACHINE FOR SLICING UNPEELED APPLES INTO RINGS

The present invention and application are owned by the assignee of each of the aforementioned patents.

BACKGROUND OF THE INVENTION

As an adjunct to the machine shown in U.S. Pat. No. 3,586,081 for automatically orienting apples fed from a bulk supply, means are provided for cutting the oriented apple into a plurality of annular segments which are later useful as decorations in salads and the like.

SUMMARY OF THE INVENTION

It is in general the broad object of the present invention to provide, as an adjunct to an apple orientor as shown in the aforementioned U.S. Pat. No. 3,586,081, means for removing the top and bottom sections of the apple and severing the remaining apple body into a plurality of annular segments which are joined together by an uncut core. When this uncut core is severed, the segments are released at random for subsequent collection and packaging. Since the unusable top and bottom portions of the apple were removed in the trimming process, the dispensed apple segments do not require any further sorting.

BRIEF DESCRIPTION OF THE DRAWINGS

FIG. 1 is a diagrammatic view showing how the apples are fed into the machine, oriented and then cut into annular segments which, upon the final coring operation, are released.

FIG. 2 is a plan view of the cutting mechanism performing the annular cuts in the apple.

FIG. 3 is a side elevation of the cutting mechanism shown in FIG. 2.

FIG. 4 is a diagrammatic view showing the path of the apple in relation to the cutting blade.

FIG. 5 is a section taken along the line 5—5 in FIG. 4.

FIGS. 6, 7 and 8 are a series of three views showing how the apple which has been cut into a plurality of annular segments is finally cored and the segments released.

DESCRIPTION OF THE BEST MODE OF PRACTICING THE INVENTION

Apples which have been oriented are fed into the machine as shown in U.S. Pat. No. 3,586,081 wherein each apple is impaled on a rotatable fork 4 for continuous movement over a circular path. As in the aforementioned patent, the apple is held between its stem and blossom indents when it is impaled by the fork against stop plate 5 so that the apple is held aligned along its major axis. An apple so impaled is carried past a knife structure generally indicated at 6 in FIGS. 2 and 3. This knife means is mounted upon the frame of the machine which is generally indicated at 7 and comprises an upper and lower trim knife pair and a series of flat knives mounted horizontally along the path of the apple. These include knife pairs 8 and 9 for cutting the upper and lower portions of the apples. Next the upper portion of the apple is removed by upstanding trim knife 10 and the lower portion removed by trim knife 15. These are followed by a knife 11 for cutting an intermediate portion of the apple at an elevation above the cut made by knife 9 on the lower portion of the apple. This in turn is followed by knife 12 which cuts the apple at an elevation slightly raised above knife 11. This is followed by knife 13 which cuts the apple about its mid section. This is followed by knife 14 which continues the cutting at the mid section of the apple and completes the cutting of the apple. As shown in FIG. 4 each of the blades consists of three sectors, longitudinally spaced along the path of the apple. First sector 26 cuts through the peel of the apple as the apple is rotated therealong. Second sector 27 cuts the major portion of the apple and third sector 28 makes the final cut adjacent to fork 4. As shown in FIG. 2, these sectors are staggered along the path of the apple so that only one of the major cutting sectors 27 is in contact with the apple at any one time and this therefore reduces the torque force between the fork and apple. All of the knives are mounted upon a base plate structure 21 by means of studs 22 extending through several tubular spacers 23.

The several cuts are each of a depth leaving intact a small cylindrical uncut portion of the apple adjacent the fork, usually about 1/16th of an inch thick, as is shown in the lefthand view in FIG. 6. When the apple arrives at station 31 in FIG. 4, the coring tube generally indicated at 32 is raised into contact with the sliced apple. The coring tube includes the cutter 33 at its upper end which serves to sever the uncut tubular core in the apple as appears in FIG. 7. As the coring tube 32 is withdrawn, plate 34 engages the bottom of the apple (see FIGS. 17, 18 and 46 in the aforementioned patent) which releases the several annular apple segments to one side into a discharge chute, not shown.

We claim:

1. A machine for cutting an apple into annular segments including a conveyor for moving an unpeeled apple continuously along a path past a cutting station, means for continuously rotating each apple on the conveyor about its major axis, a plurality of flat fixed knives spaced along the path at the cutting station for cutting the apple transversely to its major axis into segments and means for coring the apple to release the several annular segments.

2. A machine as in claim 1 wherein the knives cut the apple partially into segments which are joined together by an unsevered internal core which is subsequently removed by the coring means to release the several segments from one another.

3. A machine as in claim 1 further including a pair of upstanding trim knives cutting in parallelism with the apple major axis to first cut away the opposite ends of each apple, and wherein the flat knives then segment the apple intermediate said ends.

4. A machine as in claim 1 wherein the flat knives each have a major cutting sector of generally increasing proximity to the apple major axis as the conveyor moves the apple along the path past the cutting station.

5. A machine as in claim 4 wherein the major cutting sectors of at least some of the flat knives are staggered along the path of the apple so those major cutting sectors contact the apple in sequence substantially one at a time.

6. A machine as in claim 4 wherein the major cutting sector of each flat knife is preceded by a skin cutting sector and followed by a trimming sector for the core both of which are substantially parallel to the path of apple travel.

* * * * *